US011343762B1

(12) United States Patent
Marupaduga (10) Patent No.: US 11,343,762 B1
(45) Date of Patent: May 24, 2022

(54) SERVING CELL SELECTION BASED ON BACKHAUL CONNECTION MAXIMUM BIT RATE AND PACKET-DROP RATE

(71) Applicant: Sprint Spectrum L.P., Overland Park, KS (US)

(72) Inventor: Sreekar Marupaduga, Overland Park, KS (US)

(73) Assignee: Sprint Spectrum L.P., Overland Park, KS (US)

( * ) Notice: Subject to any disclaimer, the term of this patent is extended or adjusted under 35 U.S.C. 154(b) by 15 days.

(21) Appl. No.: 16/947,789

(22) Filed: Aug. 17, 2020

(51) Int. Cl.
*H04W 48/20* (2009.01)
*H04W 88/08* (2009.01)
*H04W 76/15* (2018.01)
*H04W 88/14* (2009.01)
*H04W 28/02* (2009.01)
*H04W 28/06* (2009.01)

(52) U.S. Cl.
CPC ....... *H04W 48/20* (2013.01); *H04W 28/0257* (2013.01); *H04W 28/06* (2013.01); *H04W 76/15* (2018.02); *H04W 88/085* (2013.01); *H04W 88/14* (2013.01)

(58) Field of Classification Search
CPC ..... H04W 48/20; H04W 76/15; H04W 88/08; H04W 88/085; H04W 88/14
See application file for complete search history.

(56) References Cited

U.S. PATENT DOCUMENTS

| 9,185,706 | B2 | 11/2015 | Lindoff et al. | |
|---|---|---|---|---|
| 10,805,831 | B1* | 10/2020 | Sung | H04W 16/04 |
| 10,863,405 | B2* | 12/2020 | Shi | H04W 36/30 |
| 2012/0115468 | A1 | 5/2012 | Lindoff et al. | |
| 2014/0016537 | A1* | 1/2014 | Khobare | H04W 36/30 370/315 |
| 2014/0362776 | A1* | 12/2014 | Tian | H04W 48/20 370/329 |
| 2015/0341838 | A1 | 11/2015 | Pinheiro et al. | |

(Continued)

OTHER PUBLICATIONS

H. Galeana-Zapien and R. Ferrus, "Design and Evaluation of a Backhaul-Aware Base Station Assignment Algorithm for OFDMA-Based Cellular Networks," IEEE Transactions on Wireless Communications, vol. 9, No. 10, pp. 3226-3237, Oct. 2010.

(Continued)

*Primary Examiner* — Robert C Scheibel (57) ABSTRACT

A method and system to control selection of a serving cell for a UE. An example method includes determining respectively for each candidate cell of multiple candidate cells a maximum backhaul bit rate of the candidate cell, determining that a given one of the candidate cells has a highest determined maximum backhaul bit rate among the candidate cells, and based at least on the determining that the given candidate cell has the highest determined maximum backhaul bit rate among the candidate cells, selecting the given candidate cell to be the serving cell for the UE. Further, the method could also include basing the selection on consideration of a backhaul packet-drop rate of the given cell. In example implementations, the selection of a serving cell could be a selection of a PCell for carrier-aggregation service, an anchor cell for dual-connectivity service, or a secondary cell for dual-connectivity service, among other possibilities.

15 Claims, 5 Drawing Sheets

(56) References Cited

U.S. PATENT DOCUMENTS

| | | |
|---|---|---|
| 2016/0212790 A1 | 7/2016 | Fujishiro et al. |
| 2017/0019811 A1* | 1/2017 | Parulkar .............. H04L 41/0654 |
| 2017/0055224 A1* | 2/2017 | Boccardi ............... H04W 28/08 |
| 2017/0223626 A1* | 8/2017 | Zhuang ............... H04L 43/0882 |
| 2018/0084513 A1 | 3/2018 | Sheashua et al. |
| 2019/0116600 A1* | 4/2019 | Terry .................... H04W 48/16 |
| 2021/0195675 A1* | 6/2021 | Park ...................... H04W 88/14 |
| 2021/0266991 A1* | 8/2021 | Teyeb ............... H04W 28/0268 |

OTHER PUBLICATIONS

U.S. Appl. No. 16/358,423, filed Mar. 19, 2019.

* cited by examiner

SERVING CELL SELECTION BASED ON BACKHAUL CONNECTION MAXIMUM BIT RATE AND PACKET-DROP RATE

BACKGROUND

A typical wireless communication system includes a number of access nodes that are configured to provide coverage in which user equipment devices (UEs) such as cell phones, tablet computers, machine-type-communication devices, tracking devices, embedded wireless modules, and/or other wirelessly equipped communication devices (whether or not user operated), can operate. Further, each access node could be coupled with a core network that provides connectivity with various application servers and/or transport networks, such as the public switched telephone network (PSTN) and/or the Internet for instance. With this arrangement, a UE within coverage of the system could engage in air-interface communication with an access node and could thereby communicate via the access node with various application servers and other entities.

Such a system could operate in accordance with a particular radio access technology (RAT), with communications from an access node to UEs defining a downlink or forward link and communications from the UEs to the access node defining an uplink or reverse link.

Over the years, the industry has developed various generations of RATs, in a continuous effort to increase available data rate and quality of service for end users. These generations have ranged from "1G," which used simple analog frequency modulation to facilitate basic voice-call service, to "4G"—such as Long Term Evolution (LTE), which now facilitates mobile broadband service using technologies such as orthogonal frequency division multiplexing (OFDM) and multiple input multiple output (MIMO). And recently, the industry has completed initial specifications for "5G" and particularly "5G NR" (5G New Radio), which may use a scalable OFDM air interface, advanced channel coding, massive MIMO, beamforming, and/or other features, to support higher data rates and countless applications, such as mission-critical services, enhanced mobile broadband, and massive Internet of Things (IoT).

In accordance with the RAT, each access node could be configured to provide coverage and service on one or more radio-frequency (RF) carriers. And the coverage provided by a given access node on a given carrier could be considered to define a respective "cell".

Each such carrier could be frequency division duplex (FDD), with separate frequency channels for downlink and uplink communication, or time division duplex (TDD), with a single frequency channel multiplexed over time between downlink and uplink use. And each such frequency channel could be defined as a specific range of frequency (e.g., in RF spectrum) having a bandwidth and a center frequency and thus extending from a low-end frequency to a high-end frequency.

Further each carrier could be defined within an industry standard frequency band, by its frequency channel(s) being defined within the frequency band. Examples of such frequency bands include (i) bands 2, 4, 12, 25, 26, 66, 71, and 85, supporting FDD carriers (ii) band 41, supporting TDD carriers, and (iii) bands n258, n260, and n261, supporting FDD and TDD carriers, among numerous other possibilities.

On the downlink and uplink channels, the coverage of each cell could define an air interface configured in a specific manner to define physical resources for carrying information wirelessly between the access node and UEs.

Without limitation, for instance, the air interface could be divided over time into a continuum of frames, subframes, and symbol time segments, and over frequency into subcarriers that could be modulated to carry data. The example air interface could thus define an array of time-frequency resource elements each being at a respective symbol time segment and subcarrier, and the subcarrier of each resource element could be modulated to carry data. Further, in each subframe or other transmission time interval, the resource elements on the downlink and uplink could be grouped to define physical resource blocks (PRBs) that the access node could allocate as needed to carry data between the access node and served UEs.

In addition, certain resource elements on the example air interface could be reserved for special purposes.

For instance, on the downlink, certain resource elements could be reserved to carry synchronization signals that UEs could detect as an indication of the presence of coverage and to establish frame timing. Further, the synchronization signals could also function as reference signals that UEs could measure in order to determine coverage strength, or other resource elements could be reserved to carry a separate reference signal for that purpose. And still further, other resource elements could be reserved to carry other control signaling such as PRB-scheduling directives and acknowledgement messaging from the access node to served UEs.

And on the uplink, certain resource elements could be reserved to carry random access signaling from UEs to the access node, and other resource elements could be reserved to carry other control signaling such as PRB-scheduling requests and acknowledgement signaling from UEs to the access node.

Overview

In a representative system, each access node could have one or more backhaul connections through which the access node could communicate on the core network and/or with one or more other access nodes. By way of example, each access node could be coupled with a network router that provides connectivity with the core network. Further, various access nodes could be coupled with the same such router as each other or with different respective routers than each other.

Each router in this arrangement could have a number of network ports (e.g., Ethernet ports) and could be configured in a conventional manner to route data between the ports. Thus, at a given router, each of one or more ports might be coupled with one or more access nodes, and each of one or more other ports might be coupled with one or more upstream core-network nodes, so that the router can route packet-based traffic between the access node(s) and the core network.

In practice, each such router port could be configured with a maximum bit rate, which could define a maximum rate at which the router will allow data to flow through the port. Examples of maximum bit rates could be 100 megabits/second (Mbps), 1 gigabit/second (Gbps), 10 Gbps, and 100 Gbps, among other possibilities. The maximum bit rate per port could be set at the time of manufacture of the router and/or might be configurable and configured after manufacture. Further, the various ports of a given router might have different maximum bit rates than each other. For instance, one or more ports might support up to 1 Gbps, while one or more other ports might support up to 10 Gbps.

An access node that provides multiple cells, perhaps on multiple different frequency bands and/or with multiple different duplex modes, might be coupled with multiple different router ports. For instance, if the access node provides coverage on multiple different frequency bands, the access node might have a separate baseband unit (BBU) or channel card respectively for each frequency band, and each BBU or channel card of the access node might be coupled with a different respective router port.

Because router ports could have different maximum bit rates than each other, and because each of one or more access nodes in a representative system could be connected with one or more router ports including possibly a different respective port per cell, each cell in the representative system might therefore have a respective maximum backhaul bit rate. For instance, the backhaul connection of a first cell provided by a first access node (e.g., on a first frequency band) might have a maximum bit rate of 1 Gbps, whereas the backhaul connection of a second cell provided by the same first access node (e.g., on a second frequency band) might have a maximum bit rate of 10 Gbps, and the backhaul connection of a third cell provided by a second access node might have a maximum bit rate of 1 Gbps.

Given these potentially different maximum backhaul bit rates per cell, it may also be the case that the representative system experiences different respective backhaul packet-drop rates per cell. For instance, in the downlink direction, if the router has more data per unit time to send to an access node via a given router port than the maximum bit rate of the router port, the router may experience a buffer overflow and have to drop packets that are held too long. For a given cell whose backhaul connection is through a given such router port, the quantity of such packets that the router drops per unit time as to that router port could be considered to define a packet-drop rate of that router port and thus a backhaul packet-drop rate of the cell. (Backhaul packet-drop rate could be defined in other ways as well, possibly considering communication in the uplink direction too.) And depending on the extent of service being provided, a cell whose associated router port has a relatively low maximum bit rate may likely have a higher backhaul packet-drop rate than a cell whose associated router port has a relatively high maximum bit rate.

The present disclosure provides for taking into account the maximum backhaul bit rate respectively of each of one or more cells, and perhaps further the backhaul packet drop rate respectively of each such cell, as a basis to determine which of the cells should serve a UE. For instance, when faced with a choice of multiple cells that could serve the UE, a computing system could compare the maximum backhaul bit rates of the cells and could select the cell that has the higher maximum backhaul bit rate. Further, faced with a tie between candidate serving cells, or in other scenarios, the computing system could select the cell that has the lower backhaul packet-drop rate.

This process could thus apply in various contexts.

By way of example, the process could apply as a basis to select a primary serving cell for carrier-aggregation service of a UE, where the UE would be served concurrently on multiple cells of a given access node, and where one of the cells would be a primary serving cell (PCell) of the UE. For instance, if a UE is served by an access node and the access node is going to configure or reconfigure carrier-aggregation service for the UE, the computing system could select one of the multiple cells to be the UE's PCell cell, with the selecting being based on the selected call having the highest maximum backhaul bit rate of the multiple cells. And faced with a tie among multiple candidate cells, the computing system might select as the PCell the candidate cell that has the lowest backhaul packet-drop rate among the tied cells.

As another example, the process could apply as a basis to select an anchor or secondary cell for dual-connectivity service of a UE, where the UE would be served concurrently on at least two connections with respective access nodes. In a typical dual-connectivity scenario, one of the UE's serving access nodes could be a master node (MN) for the dual-connectivity service, and the cell (e.g., PCell) on which the UE is connected with that MN could operate as an anchor cell for the UE's dual-connectivity service. Whereas, the UE's other serving access node could be a secondary node (SN), and the cell (e.g., PCell) on which the UE is connected with the SN could operate as a secondary cell for the UE's dual-connectivity service.

In that context, faced with a choice of multiple cells to be the UE's anchor cell for dual-connectivity service (possibly cells provided by different candidate MNs), the computing system could select a cell to be the UE's anchor cell, with the selecting being based on the selected cell having the highest maximum backhaul bit of the multiple cells. Further or alternatively, faced with a choice of multiple cells to be the UE's secondary cell for dual-connectivity service (possibly cells provided by different candidate SNs), the computing system could select a cell to be the UE's secondary cell, with the selecting likewise being based on the selected cell having the highest maximum backhaul bit rate of the multiple cells. And in each of these examples, faced with a tie as to maximum backhaul bit rate, the computing system could similarly use backhaul packet-drop rate as a basis to break the tie.

These as well as other aspects, advantages, and alternatives will become apparent to those reading the following description, with reference where appropriate to the accompanying drawings. Further, it should be understood that the discussion in this overview and elsewhere in this document is provided by way of example only and that numerous variations are possible.

DETAILED DESCRIPTION

Referring to the drawings, as noted above, FIG. 1 is a simplified block diagram of an example wireless communication system in which various disclosed features could be implemented. It should be understood that variations of this and other disclosed arrangements and operations are possible as well. For instance, various described entities, connections, functions, and other elements could be added, omitted, distributed, re-located, re-ordered, combined, or changed in other ways. Further, operations described as being carried out by one or more entities could be carried out by suitably configured components, such as by one or more processing units executing program instructions, among other possibilities.

Figure 1:
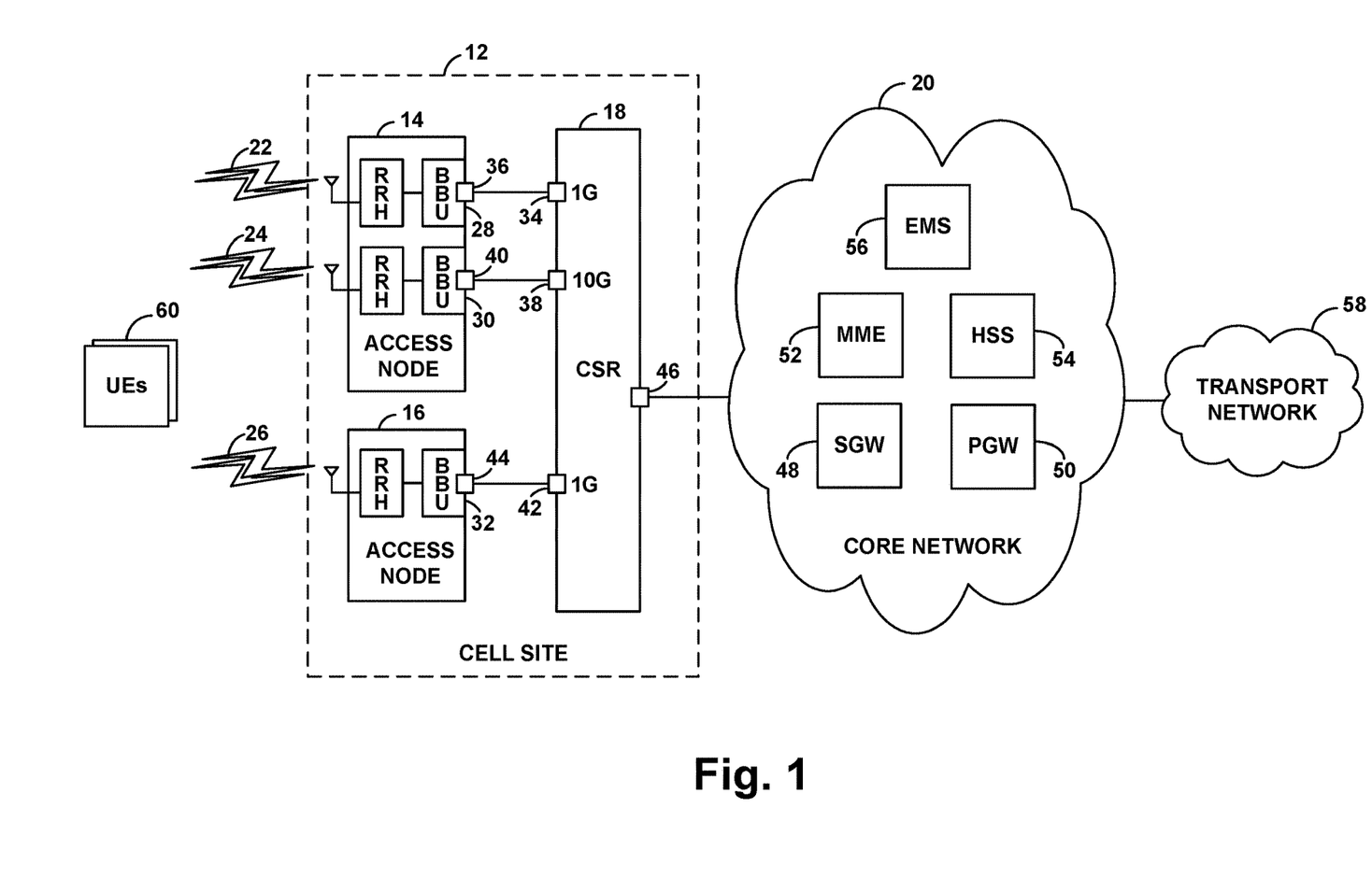
FIG. 1 is a simplified block diagram of an example network arrangement in which aspects of the present disclosure can be implemented.

As shown n FIG. 1, the example system includes a cell site 12 having two example access nodes 14, 16, and having a cell site router (CSR) 18 that provides backhaul connectivity between the example access nodes 14, 16 and an example core network 20.

Access nodes 14, 16 could each be a macro access node of the type configured to provide a wide range of coverage or could take other forms, such as a small cell access node, a repeater, a femtocell access node, or the like, possibly configured to provide a smaller range of coverage. Further, each access node could be configured to operate in accordance with a respective RAT, such as one of those noted above. For instance, access node 14 might be a 4G evolved Node-B (eNB) configured to operate in accordance with 4G LTE, and access node 16 might be a 5G next generation Node-B (gNB) configured to operate in accordance with 5G NR. Alternatively, the access nodes could be configured to operate in accordance with other RATs and possibly in accordance with the same RATs as each other.

In addition, each access node could be configured to provide one or more cells, each defined on a respective carrier in a given frequency band and having a given duplex mode (e.g., FDD or TDD). In the example shown, for instance, access node 14 is configured to provide one or more cells 22, which might be defined in given frequency band, and one or more other cells 24, which might be defined in another frequency band. And access node 16 is configured to provide one or more cells 26, which might be defined in one of those frequency bands or in another frequency band.

The air interface of each such cell could be structured as described above by way of example, being divided over time into frames, subframes, timeslots, and symbol time segments, and over frequency into subcarriers, thus defining the array of air-interface resource elements grouped into PRBs allocable by the access node as noted above, for use to carry data to or from served UEs. The air-interfaces under different RATs, however, might differ from each other in various ways now known or later developed, such as with different subcarrier spacing, different symbol time segment length, and/or use of different MIMO technologies, among other possibilities.

In an example implementation as shown in FIG. 1, each of the access nodes 14, 16 could include at least one antenna structure, at least one remote radio head (RRH), and at least one BBU. For example, the cell site 12 could include a massive-MIMO antenna array shared by the access nodes, or each access node could have its own respective antenna array. Each RRH of an access node could then include a radio and other RF circuitry defining an RF transmit chain and an RF receive chain, with components such as power amplifiers, filters, and digital-analog converters, to facilitate RF communication via the access node's antenna structure. And each BBU of an access node could include processing components to facilitate baseband signal processing, general access node control, and backhaul communication.

With this arrangement, each BBU could be configured to handle communications on a given frequency band. Therefore, access node 14 is configured to provide service on at least two different frequency bands, then access node 14 could include at least two BBUs 28, 30. BBU 28 could be configured to handle communications on the one or more cells 22 of one frequency band, and BBU 30 could be configured to handle communications on the one or more cells 24 of another frequency band. And if access node 16 is configured to provide service on a single frequency band, then access node 16 could include a single BBU 32 configured to handle communications on the one or more cells 26 of that single frequency band.

In a representative arrangement, the example cell site 12 could include an antenna tower and an equipment room or cabinet at the base of the antenna tower. Each RRH of an access node could be mounted on the tower. And an associated BBU of the access node could be housed in the equipment room or cabinet and connected with the RRH by a multi-fiber cable. Further, the equipment room or cabinet could also house the cell site's CSR 18, which as noted above could provide connectivity with the core network 20.

The CSR 18 could be a network router, configured to forward data packets from point to point, between the cell site 12 and entities on the core network 20, and between the access nodes 14, 16, among other possibilities. As such, the CSR 18 could include multiple ports supporting physical and logical network connections with other devices.

As shown in FIG. 1, for instance, a port 34 of the CSR 18 could be connected by a network cable with a port 36 of BBU 28 of access node 14, another port 38 of the CSR 18 could be connected by a network cable with a port 40 of BBU 30 of access node 14, and yet another port 42 of the CSR 18 could be connected by a network cable with a port 44 of BBU 32 of access node 16. Further, another port 46 of the CSR 18 could be connected by a network cable with the core network 20 (e.g., with an upstream router, switch, or gateway of the core network 20).

As noted above, each such port of the CSR 18 might have a respective maximum bit rate defining the maximum rate of data flow that the CSR 18 would allow through the port. Without limitation, for instance, as shown, port 34 of the CSR 18 has a maximum bit rate of 1 Gbps, port 38 of the CSR 18 has a maximum bit rate of 10 Gbps, port 42 of the CSR 18 has a maximum bit rate of 1 Gbps, and port 46 of the CSR 18 has a maximum but rate of 10 Gbps. A processing unit of the CSR 18 could be programmed or otherwise configured with these maximum bit rate settings per port and could govern data flow accordingly.

As further noted above, these maximum bit rates of the various CSR ports could define maximum backhaul bit rates for the cells that are served by the associated BBUs coupled with the CSR ports. Thus, each of the one or more cells 22 that are served by BBU 28 of access node 14 could be deemed to have a maximum backhaul bit rate of 1 Gbps, because the CSR port 34 through which BBU 28 is connected with the core network 20 has a maximum bit rate of 1 Gbps. Likewise, each of the one or more cells 24 that are served by BBU 30 of access node 14 could be deemed to have a maximum backhaul bit rate of 10 Gbps, because the CSR port 38 through which BBU 30 is connected with the core network 20 has a maximum bit rate of 10 Gbps. And each of the one or more cells 26 that are served by BBU 32 of access node 16 could be deemed to have a maximum backhaul bit rate of 1 Gbps, because the CSR port 42 through which BBU 32 is connected with the core network 20 has a maximum bit rate of 1 Gbps.

Note that, for each such cell, there may be other backhaul restrictions as well, which may be more or less restrictive than these CSR-port bit rate restrictions. For instance, the network ports of the illustrated BBUs might also have predefined maximum bit rates, and the network cables and/or other links between the BBUs and the CSR ports might have associated maximum bit rates. Further, one or more upstream routers or other nodes of core network 20 might also have an associated maximum bit rate. While the present disclosure is focused mainly on backhaul restrictions of CSR ports, the disclosed principles could extend to apply with respect to these other backhaul points as well. In addition, while a single CSR is shown serving access nodes 14, 16, separate CSRs could be provided instead.

As further noted above, given the maximum bit rate respectively of each CSR port, it is possible that each CSR port could also have a respective packet-drop rate, as a rate of packets dropped per unit time due to being buffered too long as a result of the port's maximum bit rate. Further, this packet-drop rate per CSR port could vary over time, depending on the extent of communications between the core network and the associated BBU, among other factors. And as noted above, the packet-drop rate per CSR could be correlated with each cell served by the associated BBU, to define a backhaul packet-drop rate of the cell. Thus, each cell could have a variable backhaul packet-drop rate as a result of the maximum bit rate of the cell's associated CSR port and the level of communication attempted through that port.

Core network 20 could be a packet-switched network, such as an Evolved Packet Core (EPC) network or Next Generation Core (NGC) network, supporting Internet Protocol (IP) communication and virtual packet tunnel interfaces between network nodes. In the example shown, the core network 20 includes a serving gateway (SGW) 48, a packet data network gateway (PGW) 50, a mobility management entity (MME) 52, a home subscriber server (HSS) 54, and an element management system (EMS) 56, although other arrangements are possible as well.

With this arrangement, each BBU of an access node could have an assigned IP address on the core network 20, through the BBU's connection with the CSR 18. Each BBU could then communicate with the SGW 48, the SGW 48 could communicate with the PGW 50, and the PGW 50 could provide connectivity with a transport network 58, such as the Internet. Further, each BBU could communicate with the MME 52, and the MME 52 could communicate with the SGW 48, so that the MME 52 could coordinate setup of bearers for UEs to engage in packet-data communication. Still further, the HSS 54 could store or otherwise have access to UE profile records, which could specify service-subscription plans, UE configurations, and/or other such UE capability information. And the EMS 56 could operate as a central repository of operational data for the wireless communication network and to control and manage operation of various network elements.

FIG. 1 also depicts various example UEs 60 that may from time to time be within coverage of cell site 12 and may be served by the access nodes 14, 16. Each such UE could take any of the forms noted above, among other possibilities, and might be configured to support service according to one or more applicable RATs. For instance, a UE may have a 4G LTE radio and associated RF circuitry and logic, and/or a 5G NR radio and associated RF circuitry and logic. In addition, if a UE is configured to support both 4G service and 5G service, the UE might also be configured to support 4G-5G dual connectivity, such as EUTRA-NR Dual Connectivity (EN-DC).

When such a UE enters into coverage of the cell site 12, the UE could initially scan for coverage on a preferred RAT on one or more carriers and could thereby discover threshold strong coverage of at least one cell, such as one of cells 22, 24, 26. And the UE could then engage in random-access and Radio Resource Control (RRC) signaling with the access node that provides the cell, to establish an RRC connection defining a logical air-interface connection between the UE and the access node. And the access node could establish in data storage a context record for the UE, indicating the state of the UE's connection.

Further, if the UE is not already registered for service with the core network, the UE could engage in attach signaling with the MME 52 through the UE's established air-interface connection, and the MME 52 could coordinate setup for the UE of at least one user-plane bearer. For instance, the MME 52 could engage in signaling with the UE's serving access node and the SGW 48 to coordinate setup for the UE of an S1-U packet tunnel between the access node and the SGW 48, the SGW 48 could responsively engage in signaling with the PGW 50 to set up for the UE a corresponding S5 packet tunnel between the SGW 48 and the PGW 50, and the access node could also responsively engage in signaling with the UE to set up a corresponding data radio bearer (DRB) over the air between the access node and the UE.

In addition, in relation to this attachment process and/or at another time, the access node could obtain service profile data of the UE and could store the data in the UE context record. For instance, the MME 52 could obtain this data from the HSS 54 and could provide the data to the access node. Or the UE itself might report this data to the access node.

Once the UE is so connected and attached, the access node could then serve the UE with packet-data communications. For instance, when the core network has data to send to the UE, the data could flow over a bearer to the UE's serving access node, and the access node could allocate downlink PRBs of the UE'S serving cell for carrying the data and could transmit the data to the UE in the allocated downlink PRBs. And when the UE has data to transmit, the UE could send a scheduling request to in its serving cell to its serving access node, the access node could allocate uplink PRBs of the cell for carrying the data, and the UE could accordingly transmit the data to the access node in the allocated uplink PRBs.

The system shown in FIG. 1 could also support serving a given UE on multiple cells at once. For instance, the system could support carrier-aggregation service and/or dual-connectivity service.

As noted above, carrier-aggregation service involves a given access node serving a UE concurrently on multiple cells provided by the access node. For instance, the UE could first connect with the access node on a given cell, and the access node could then add to the UE's air-interface connection one or more additional cells provided by the access node. By way of example, the access node could update the UE context record to indicate that the UE is served on the multiple cells, and the access node could transmit to the UE an RRC message that designates the set of cells. With multiple cells in the UE's connection with the access node, the access node could then coordinate air-interface communication with the UE concurrently on the multiple cells, such as by allocating PRBs distributed across the cells, which could help to provide the UE with increased peak data rate of communication.

As further noted above, with carrier-aggregation service, one of the UE's serving cells could be deemed the UE's PCell. In some implementations, the PCell may be used for both downlink and uplink user-plane communications with the UE, and each other cell may be used for just downlink communications with the UE. Thus, in those implementations, uplink user-plane communications from the UE would flow through the PCell and its associated BBU to the core network. Further, the PCell and its associated BBU could be the anchor for core-network control-plane signaling with or for the UE. Therefore, any such control-plane signaling may also flow through the PCell's associated BBU to/from the core network.

When an access node will serve a UE with carrier aggregation service, the access node could designate one of the carriers in the UE's connection as being the UE's PCell and could inform the UE of this designation. For instance, the access node could designate the cell on which the UE initially connects with the access node as being the UE's PCell. Alternatively, the access node could designate another one of the cells in the UE's connection as being the UE's PCell. The access node could then proceed to serve the UE accordingly.

As further noted above, dual-connectivity service involves multiple access nodes serving a UE concurrently on respective air-interface connections, with one access node functioning as the UE's MN and the another access node functioning as the UE's SN. More particularly, the UE could be connected on an anchor cell provided by the MN (e.g., a PCell of the UE's connection with the MN), and the UE could be connected on a secondary cell provided by the SN (e.g., a PCell of the UE's connection with the SN). With EN-DC, by way of example, a 4G eNB could be the UE's MN, serving the UE on a 4G cell as the UE's anchor cell, and a 5G gNB could be the SN, serving the UE on a 5G cell as the UE's secondary cell.

With example dual connectivity, the BBU that serves the UE's anchor cell could be responsible for coordinating setup and teardown of dual-connectivity service for the UE and possibly functioning as an anchor point for RRC signaling with the UE and core-network control signaling related to the UE. Whereas the UE's secondary cell could operate mainly to provide added connectivity and increased aggregate bandwidth for the UE.

In a representative arrangement, the UE could initially connect with an anchor cell provided by an access node that will be the UE's MN, and the BBU serving that anchor cell could then work to configure dual-connectivity service for the UE. Configuring the dual-connectivity service could involve receiving from the UE a report of the UE being in threshold strong of one or more candidate secondary cells provided by one or more candidate SNs, selecting a secondary cell, and coordinating setup of a secondary connection for the UE in that secondary cell. Further, configuring dual-connectivity service could also involve setting up a split bearer for the UE, so that the MN and SN could then concurrently serve the UE with data communications.

Setting up a split bearer could involve engaging in signaling to transfer a UE bearer from being anchored at the MN (e.g., at the BBU serving the UE's anchor cell) to being anchored instead at the SN (e.g., at the BBU serving the UE's secondary cell), and arranging for exchange of some of the UE's data between the SN and the MN.

With such a split bearer configured for the UE, downlink data could flow from the core network to the BBU serving the UE's secondary cell, and that BBU could (i) transmit a portion of the data via the UE's secondary cell to the UE and (ii) provide another portion of the data to the BBU serving the UE's anchor cell, which that other BBU could then transmit via the UE's anchor cell to the UE. Further, when the UE has data to transmit, the UE could transmit a portion of the data via the UE's anchor cell, which the BBU serving the anchor cell could then forward to the BBU serving the secondary cell, for transmission to the core network, and (ii) the UE could transmit another portion of the data via the UE's secondary cell, which the BBU serving the secondary cell could transmit to the core network.

When an MN (e.g., the BBU serving the UE's anchor cell) determines that dual-connectivity should be configured for the UE, perhaps upon the UE connecting with the MN and the MN determining from profile data that the UE is dual-connectivity capable, the MN might face a choice of which cell should be the UE's anchor cell for the dual connectivity and which cell should be the UE's secondary cell for the dual connectivity.

As to the anchor cell, at issue could be whether the UE should remain served by the anchor cell on which the UE is currently connected or rather the UE should be handed over to a different anchor cell (provided by the same or different access node) whose BBU would then configure dual-connectivity of the UE. And as to the secondary cell, at issue could be which of multiple candidate secondary cells should serve the UE in the dual connectivity. For instance, the UE might report to being in threshold strong coverage of multiple candidate secondary cells, and the BBU serving the UE's anchor cell may therefore have a choice of which secondary cell to use for dual-connectivity service of the UE.

As noted above, the present disclosure provides for using at least the maximum backhaul bit rate per cell and possibly the backhaul packet-drop rate per cell as a basis to select a serving cell for the UE in these or other contexts.

To facilitate this, in an example implementation, a centralized data repository in an example system could be provisioned with information about the maximum backhaul bit rate respectively per cell and a latest determined backhaul packet-drop rate respectively per cell, and a computing system carrying out the disclosed process could have access to that information to facilitate selecting a serving cell for a UE. Without limitation, an example data repository could be the EMS 56 noted above.

For instance, as cell sites are deployed or reconfigured in the system, CSRs could programmatically report to the data repository their maximum bit rate per port, keyed to unique CSR and port identification, which the data repository could store. Further, on an ongoing basis (e.g., periodically), CSRs could also track their respective packet-drop rate per port and could report to the data repository that per-port packet-drop rate, similarly keyed to CSR and port identification. In addition, engineering input or other provisioning could populate the data repository with a correlation between each cell (e.g., by unique cell identifier) and its associated CSR port (e.g., by unique CSR and port identification).

Thus, the data repository could have information indicating, for each cell in the system, the cell's maximum backhaul bit rate and the cell's latest determined backhaul packet-drop rate. And other entities, such as BBUs, could then query the data repository when necessary to obtain this information or could otherwise obtain such information. Alternatively, BBUs could be configured to query CSRs directly to determine this information per cell.

In an example implementation, when an access node is going to serve a UE with carrier aggregation, the access node may face a choice of which cell should be the UE's PCell for the carrier-aggregation service. For instance, the UE might already have multiple cells in its connection with the access node and/or the UE might report being within threshold strong coverage of one or more additional cells that could be added to the UE's connection, in which case at issue could be which cell the access node would designate as the UE's PCell for carrier aggregation.

In this case, a computing system could determine the maximum backhaul bit rate respectively of each of multiple candidate cells and could select as the PCell the candidate cell having the highest maximum backhaul bit rate. In particular, the computing system could perform a comparison between the determined maximum backhaul bit rates of the candidate cells to identify the candidate cell that has the highest maximum backhaul bit rate among the candidate cells. And the computing system could then cause that identified candidate cell to be the UE's PCell for the carrier-aggregation service.

Further, the computing system could also base the selection of PCell on a comparison of backhaul packet-drop rates respectively of the candidate cells. For instance, if multiple candidate cells tie for having the highest maximum backhaul bit rate, then the computing system could compare the backhaul packet-drop rates of the tied candidate cells to select the one that has the lowest backhaul packet-drop rate. Or the computing system might computed a weighted score for each candidate cell based on the cell's respective maximum backhaul bit rate and backhaul packet-drop rate and could select as the PCell the cell having the highest computed score. And the computing system could then cause that selected candidate cell to be the UE's PCell for the carrier-aggregation service.

The computing system that carriers out these operations could be the UE's serving access node (e.g., a BBU of the serving access node), in which case the access node could cause the selected candidate cell to be the UE's PCell. If the selected cell is already the UE's PCell, then the access node could maintain that PCell designation. Whereas, if the selected cell is not already the UE's PCell, then the access node could update a UE context record to make the selected cell the UE's PCell and could inform the UE accordingly.

Alternatively, the computing system could be provided elsewhere, such as at the EMS 56 for instance, and the computing system could cause the selected candidate cell to be the UE's PCell by signaling to the UE's serving access node to cause the serving access node to likewise cause the selected candidate cell to be the UE's PCell.

Selecting as the UE's PCell the candidate cell having the maximum backhaul bit rate, and perhaps the lowest backhaul packet-drop rate, could be especially beneficial, as the backhaul connection of the UE's PCell could be the connection that carries user-plane and control-plane signaling related to service of the UE.

In another example implementation, when a UE is going to be served with dual connectivity, a computing system could face a choice of which cell should be the UE's anchor cell for the dual-connectivity service. For instance, the UE may be connected with a given MN on an cell that is or could be the UE's anchor cell for dual connectivity, and the UE may also report being within threshold strong coverage of one or more other cells (of the same access node or on roe more other access nodes) as alternative possible anchor cells.

In this case, the computing system could likewise determine the maximum backhaul bit rate respectively of each of multiple candidate cells and could select as the anchor cell the candidate cell having the highest maximum backhaul bit rate. In particular, here too, the computing system could perform a comparison between the determined maximum backhaul bit rates of the candidate cells to identify the candidate cell that has the highest maximum backhaul bit rate among the candidate cells. And the computing system could then cause that identified candidate cell to be the UE's anchor cell for the dual-connectivity service. Further, the computing system could likewise base the selection of anchor cell on a comparison of backhaul packet-drop rates respectively of the candidate cells, possibly selecting the tied cell that has the lowest backhaul packet-drop rate for instance.

Here, the computing system that carries out these operations could be the BBU serving the UE's current anchor cell, such as the BBU serving the cell on which the UE initially connects with an access node, in which case that BBU could cause the selected cell to be the UE's anchor cell for dual connectivity. If the selected cell is already the UE's anchor cell, then the BBU need not change the anchor cell. Whereas, if the selected cell is not currently the UE's anchor cell, then the BBU could process a handover or other transfer of the UE from the UE's current anchor cell to the selected cell as anchor cell. Alternatively, here too, the computing system could be provided elsewhere, such as at the EMS 56 for instance, and the computing system could cause the selected candidate cell to be the UE's anchor cell by signaling to the BBU serving the UE's current anchor cell, to cause the BBU to do so.

Selecting as the UE's anchor cell the candidate cell having the maximum backhaul bit rate, and perhaps the lowest backhaul packet-drop rate, could be especially beneficial as well, as the backhaul connection of the UE's anchor cell in dual connectivity could be the connection that carries at least key control-plane signaling related to service of the UE.

In yet another example implementation, when a UE is going to be served with dual connectivity, a computing system could face a choice of which cell should be the UE's secondary cell for the dual connectivity (e.g., which of multiple candidate SNs should be the UE's SN for the dual connectivity).

In this case, the computing system could likewise determine the maximum backhaul bit rate respectively of each of multiple candidate cells and could select as the secondary cell the candidate cell having the highest maximum backhaul bit rate. In particular, here too, the computing system could perform a comparison between the determined maximum backhaul bit rates of the candidate cells to identify the candidate cell that has the highest maximum backhaul bit rate among the candidate cells. And the computing system could then cause that identified candidate cell to be the UE's secondary cell for the dual-connectivity service, e.g., causing the UE's MN to add for the UE a secondary connection with that cell and so forth as noted above. Further, the computing system could likewise base the selection of secondary cell on a comparison of backhaul packet-drop rates respectively of the candidate cells, possibly selecting the tied cell that has the lowest backhaul packet-drop rate.

As above, the computing system that carries out these operations could be the BBU serving the UE's anchor cell, in which case that BBU could cause the selected cell to be the UE's secondary cell by processing setup of dual-connectivity for the UE with the selected cell as the UE's secondary cell. For instance, the BBU could coordinate setup of a secondary connection for the UE with the selected secondary cell and could coordinate setup of a split bearer for the UE so that the UE could be served concurrently over its multiple connections. Alternatively, here as well, the computing system could be provided elsewhere, such as at the EMS 56 for instance, and the computing system could cause the selected candidate cell to be the UE's secondary cell by signaling to the BBU serving the UE's anchor cell, to cause the BBU to do so.

Selecting as the UE's secondary cell the candidate cell having the maximum backhaul bit rate, and perhaps the lowest backhaul packet-drop rate, could be especially beneficial as well, as the backhaul connection of the UE's secondary cell in dual connectivity might be the connection that carries user-plane communication to/from the UE, and/or for other reasons.

Note that in these processes, at issue could be the maximum backhaul bit rate per cell, which is distinct from the backhaul load or level of backhaul congestion per cell. In a further implementation, however, backhaul load per cell could also be considered. For instance, in addition to basing the serving cell selection on a consideration of maximum backhaul bit rate, the computing system could also determine for each of multiple candidate cells the rate of backhaul traffic flow to and/or from the BBU serving the cell, and the computing system could select a serving cell based on a comparison of such backhaul load values per cell.

Figure 2:
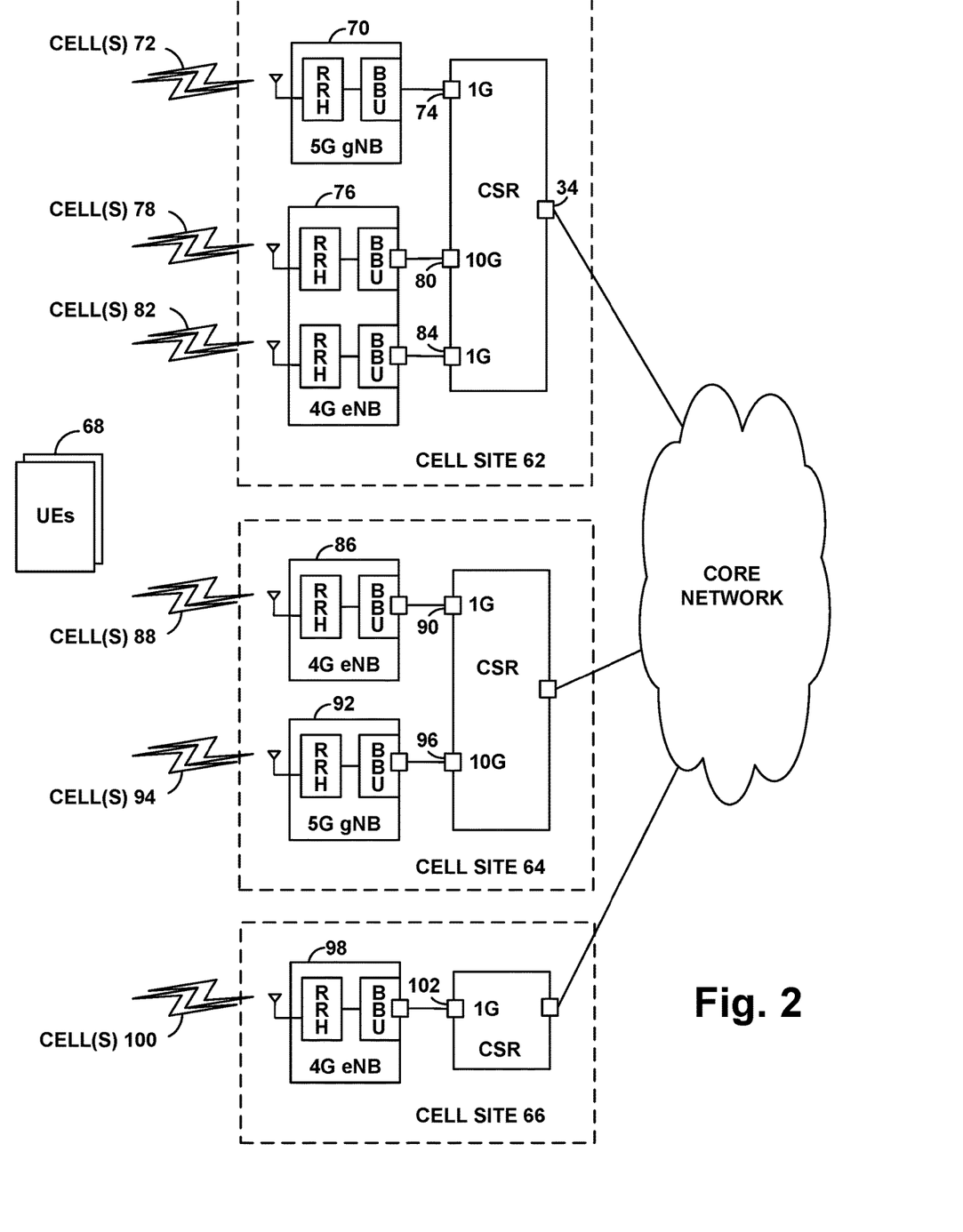
FIG. 2 is another simplified block diagram of an example network arrangement in which aspects of the disclosure can be implemented.

FIG. 2 is another block diagram to help illustrate how these processes could play out in practice. FIG. 2 depicts three example cell sites 62, 64, 66, which might all provide coverage where example UEs 68 are located.

In the example shown, cell site 62 includes (i) a 5G gNB 70 having a single BBU serving one or more cells 72 and coupled with a 1 Gbps CSR port 74, and (ii) a 4G eNB 74 with one BBU serving one or more cells 78 and coupled with a 10 Gbps CSR port 80 and another BBU serving one or more cells 82 and coupled with a 1 Gbps CSR port 84. Further, cell site 64 includes (i) a 4G eNB 86 having a single BBU serving one or more cells 88 and coupled with a 1 Gbps CSR port 90 and (ii) a 5G gNB 92 having a single BBU serving one or more cells 94 and coupled with a 10 Gbps CSR port 96. And cell site 66 includes a 4G eNB 98 having a single BBU serving one or more cells 100 and coupled with a 1 Gbps CSR port 102.

With this example arrangement, as a first example, assume that a UE 68 is connected with 4G eNB 76 on just one of cells 82—having a maximum backhaul bit rate of 1 Gbps as the maximum bit rate of CSR port 84. And assume that the 4G eNB 76 adds to the UE's connection one of cells 78—having a maximum backhaul bit rate of 10 Gbps as the maximum bit rate of CSR port 80. In this situation, the 4G eNB 76 could decide to reconfigure the UE's connection to make the cell 78 the UE's PCell for carrier-aggregation service at least in part because the cell 78 would have a higher maximum backhaul bit rate than the cell 82.

As a second example, assume that a UE 68 is connected with 4G eNB 86 on a cell 88—having a maximum backhaul bit rate of 1 Gbps as the maximum bit rate of CSR port 90. And assume that the BBU serving that cell determines that EN-DC service should be configured for the UE, perhaps upon the UE connecting and/or upon determination from profile data that the UE supports EN-DC service. In this example, at issue could be whether the BBU should have the UE stay connected on the cell 88 as anchor cell for the EN-DC service or rather whether the BBU should transfer the UE to another 4G cell to be the UE's anchor cell for the EN-DC service.

In this example, the BBU might determine (e.g., by UE measurement reporting) that the UE is in threshold strong coverage of not only of cell 88 but also a cell 78 of 4G eNB 76 and a cell 100 of 4G eNB 98. Given this, the BBU could find that (i) the maximum backhaul bit rate of the cell 88 is 1 Gbps, (ii) the maximum backhaul bit rate of the cell 78 is 10 Gbps, and (iii) the maximum backhaul bit rate of the cell 100 is 1 Gbps. And based at least on the maximum backhaul bit rate of the cell 78 being highest of these candidate cells, the BBU could decide to have that cell 78 be the UE's anchor carrier for the EN-DC service.

Accordingly, the BBU could hand over or otherwise transfer the UE from being connected with the 4G eNB 86 on the cell 88 to instead being connected with the 4G eNB 76 on the cell 78. And once that transfer is complete, the BBU serving the cell 78 could then coordinate setup of EN-DC service for the UE, with the cell 78 being the UE's anchor cell.

As a third example, assume that a UE 68 is currently connected with 4G eNB 86 on one or more cells 88, and 4G eNB 86 (e.g. the BBU serving the UE's primary connection with the 4G eNB 86), operating as MN, is going to configure EN-DC service for the UE by adding for the UE a second connection on at least a 5G cell. And assume that the UE has reported to the 4G eNB 86 that the UE is within threshold strong coverage of (i) a cell 72 of 5G gNB 70 and (ii) a cell 94 of 5G gNB 92. In this example, the 4G eNB 86 could determine that the maximum backhaul bit rate of the cell 94 (10 Gbps) is higher than the maximum backhaul bit rate of the cell 72 (1 Gbps). And based at least on this determination, the 4G eNB 86 could select the cell 94 to be the UE's secondary cell for the EN-DC service, and the 4G eNB 86 could configure EN-DC service of the UE accordingly.

As noted above, the present disclosed processes could alternatively base cell selection on consideration of maximum backhaul bit rate at another point in a cell's backhaul connection, such as at a router port upstream from the cell's associated CSR. Further, the selection of a cell could take into account one or more additional factors as well. Still further, the disclosed principles could also be applied to select a serving cell for a UE in other contexts, such as to selectin handover target for the UE possibly regardless of carrier aggregation and/or dual connectivity operation. Other variations could be possible as well.

Figure 3:
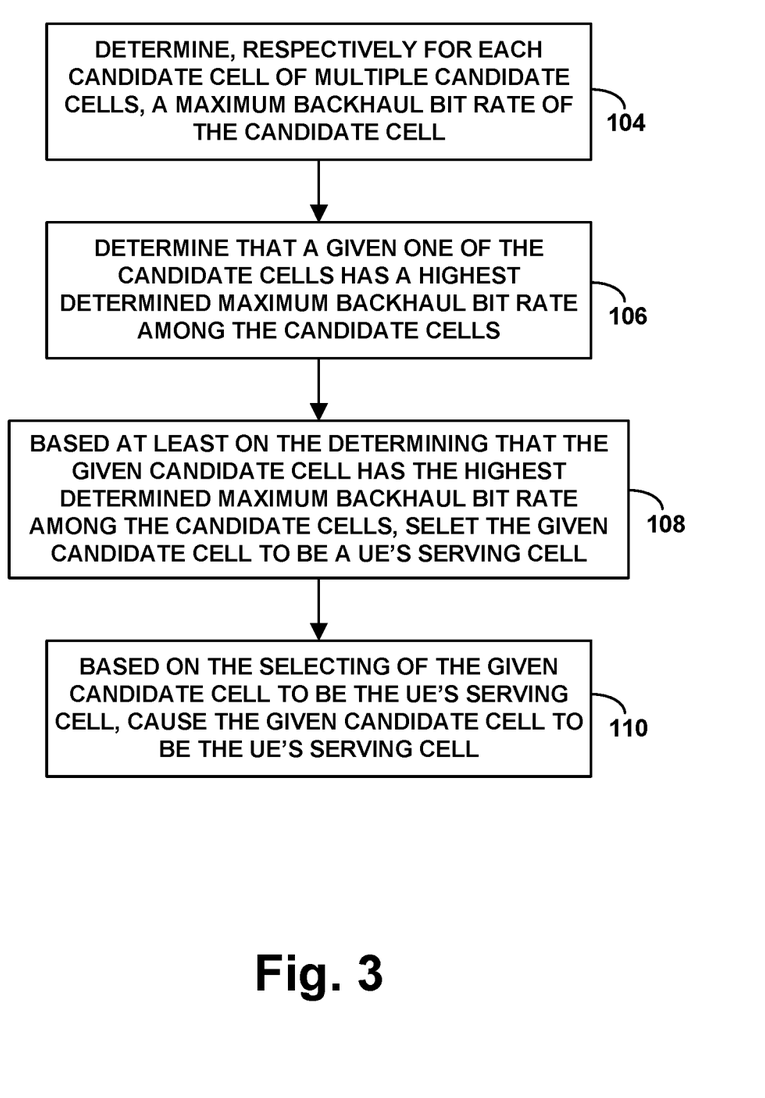
FIG. 3 is a flow chart depicting an example method in accordance with the disclosure.

FIG. 3 is next a flow chart depicting a method that could be carried out in accordance with the present disclosure to control selection of a serving cell for a UE. As noted above, this method could be carried out by an access node (e.g., BBU) currently serving the UE and/or by another computing system, such as by an EMS or the like.

As shown in FIG. 3, at block 104, the method could include determining respectively for each candidate cell of multiple candidate cells a maximum backhaul bit rate of the candidate cell. Further, at block 106, the method could include determining that a given one of the candidate cells has a highest determined maximum backhaul bit rate among the candidate cells. At block 108, the method could include, based at least on the determining that the given candidate cell has the highest determined maximum backhaul bit rate among the candidate cells, selecting the given candidate cell to be the serving cell for the UE. And at block 110, the method could include, based on the selecting of the given candidate cell to be the serving cell for the UE, causing the given candidate cell to be the serving cell for the UE.

In line with the discussion above, the maximum backhaul bit rate respectively of each cell of the candidate cells could be a predefined maximum bit rate of a respective router port through which backhaul communication for the cell flows. For instance, each cell could be provided by (e.g., served by) a respective BBU of an access node, the BBU could be connected with a CSR that provides core-network connectivity, and the respective router port could be a CSR port with which the BBU that provides the cell is connected.

As further discussed above, the method could additionally include basing the selecting of the given candidate cell to be the serving cell for the UE on consideration of backhaul packet-drop rate of the selected cell. For instance, the method could include determining that at least two of the candidate cells have the same maximum backhaul bit rate as each other and, responsive to determining that the at least two candidate cells have the same maximum backhaul bit rate as each other, selecting the given candidate cell from among the at least two candidate cells, based on a further determination that the given candidate cell has a lowest backhaul packet-drop rate among the at least two candidate cells.

In addition, as discussed above the act of selecting the given candidate cell to be the serving cell for the UE could involve selecting the given candidate cell to be (i) PCell for carrier-aggregation service of the UE, (ii) an anchor cell for dual-connectivity (e.g., EN-DC) service of the UE, or (iii) a secondary cell, of a secondary connection, for dual-connectivity (e.g., EN-DC) service of the UE.

Figure 4:
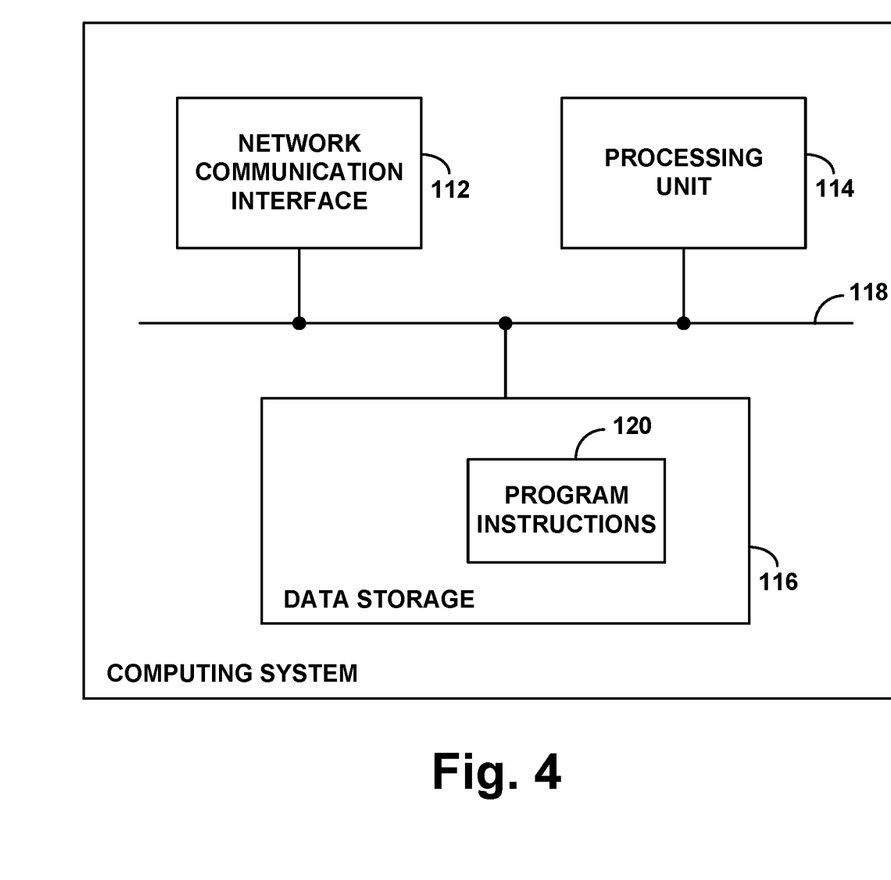
FIG. 4 is a simplified block diagram of an example computing system operable in accordance with the disclosure.

FIG. 4 is next a simplified block diagram of a computing system that could be configured to control selection of a serving cell for a UE. This computing system could be provided at an access node currently serving the UE, or at an EMS, among other possibilities.

As shown in FIG. 4, the example computing system includes a network communication interface 112, a processing unit 114, and non-transitory data storage 116, all of which could be integrated together and/or interconnected by a system bus, network, or other connection mechanism 118.

The network communication interface 112 could comprise a physical network connector and associated communication logic to facilitate network communication with various other entities. The processing unit 114 could comprise one or more general purpose processors (e.g., microprocessors) and/or one or more special-purpose processors (e.g., application specific integrated circuits). And the data storage 116 could comprise one or more volatile and/or non-volatile storage components (e.g., magnetic, optical, or flash storage).

As shown, the data storage 116 could then store program instructions 120, which could be executable by the processing unit 114 to cause the computing system to carry out various operations described herein, such as the operations depicted in FIG. 3 for instance.

Various features described above can be implemented in this context as well, and vice versa.

Figure 5:
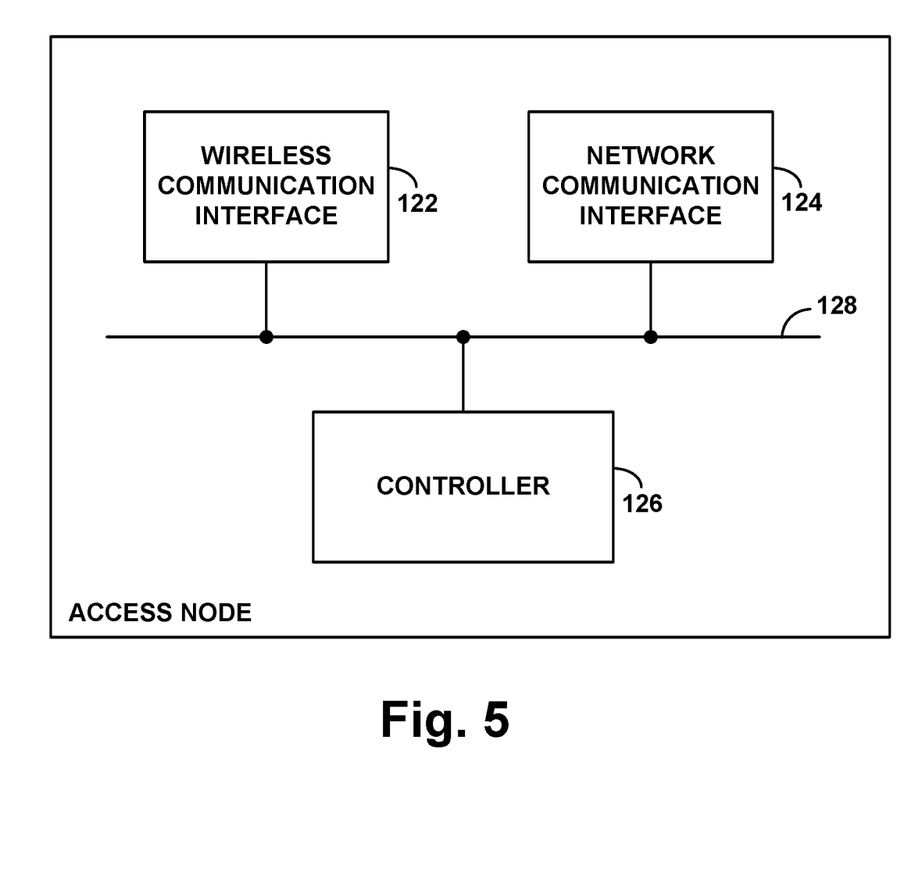
FIG. 5 is a simplified block diagram of an example access node operable in accordance with the disclosure.

FIG. 5 is next a simplified block diagram of an example access node that could operate in a wireless communication system such as that noted above for example, to carry out various features described herein. As shown, the example access node includes a wireless communication interface 122, a network communication interface 124, and a controller 126, all of which could be integrated together and/or communicatively linked together by a system bus, network, or other connection mechanism 128.

In an example implementation, the wireless communication interface 122 could comprise an antenna structure, which could be tower mounted or could take other forms, and associated components such as a power amplifier and a wireless transceiver, so as to facilitate providing a coverage area defining an air interface and engaging air-interface communication on the air interface. And the network communication interface 124 could comprise a wired or wireless interface, such as an Ethernet network communication interface, configured to support communication with other entities, such as with a CSR port for instance.

Further, the controller 126 (which might be provided by a BBU of the access node, for instance) could comprise one or more processing units (e.g., one or more general purpose processors and/or specialized processors) programmed to cause the access node to carry out various operations such as those discussed herein, such as the operations depicted in FIG. 3 for instance.

Various other features discussed herein can be implemented in this context as well, and vice versa.

The present disclosure also contemplates at least one non-transitory computer readable medium having stored thereon (e.g., being encoded with) program instructions executable by at least one processing unit to carry out various operations described above.

Exemplary embodiments have been described above. Those skilled in the art will understand, however, that changes and modifications may be made to these embodiments without departing from the true scope and spirit of the invention.

What is claimed is:

1. A method to control selection of a serving cell for a user equipment device (UE), the method comprising:
    determining respectively for each candidate cell of a plurality of candidate cells a maximum backhaul bit rate of the candidate cell, wherein determining the maximum backhaul bit rate respectively of each cell of the candidate cells comprises determining as the maximum backhaul bit rate a predefined maximum bit rate of a respective router port through which backhaul communication for the cell flows;
    determining that at least two of the candidate cells have the same maximum backhaul bit rate as each other; and
    responsive to determining that the at least two candidate cells have the same maximum backhaul bit rate as each other, selecting to be the serving cell for the UE a given candidate cell from among the at least two candidate cells, based on a determination that the given candidate cell has a lowest backhaul packet-drop rate among the at least two candidate cells.

2. The method of claim 1, further comprising:
    based on the selecting of the given candidate cell to be the serving cell for the UE, causing the given candidate cell to be the serving cell for the UE.

3. The method of claim 1, wherein each cell is provided by a respective baseband unit (BBU) of an access node, wherein the BBU is connected with a cell site router (CSR) that provides core-network connectivity, and the respective router port is a CSR port with which the BBU that provides the cell is connected.

4. The method of claim 1, wherein selecting the given candidate cell to be the serving cell for the UE comprises selecting the given candidate cell to be a primary cell (PCell) for carrier-aggregation service of the UE.

5. The method of claim 1, wherein selecting the given candidate cell to be the serving cell for the UE comprises selecting the given candidate cell to be an anchor cell for dual-connectivity service of the UE.

6. The method of claim 5, wherein the dual-connectivity service comprises EUTRA-NR Dual Connectivity (EN-DC).

7. The method of claim 1, wherein selecting the given candidate cell to be the serving cell for the UE comprises selecting the given candidate cell to be a secondary cell, of a secondary connection, for dual-connectivity service of the UE.

8. The method of claim 7, wherein the dual-connectivity service comprises EUTRA-NR Dual Connectivity (EN-DC).

9. The method of claim 1, wherein the method is carried out at least in part by an access node currently serving the UE.

10. A computing system configured to control selection of a serving cell for a user equipment device (UE), the computing system comprising:
- a network communication interface;
- a processing unit;
- non-transitory data storage; and
- program instructions stored in the non-transitory data storage and executable by the processing unit to carry out operations including:
  - determining respectively for each candidate cell of a plurality of candidate cells a maximum backhaul bit rate of the candidate cell, wherein determining the maximum backhaul bit rate respectively of each cell of the candidate cells comprises determining as the maximum backhaul bit rate a predefined maximum bit rate of a respective router port through which backhaul communication for the cell flows,
  - determining that at least two of the candidate cells have the same maximum backhaul bit rate as each other, and
  - responsive to determining that the at least two candidate cells have the same maximum backhaul bit rate as each other, selecting to be the serving cell for the UE a given candidate cell from among the at least two candidate cells, based on a determination that the given candidate cell has a lowest backhaul packet-drop rate among the at least two candidate cells.

11. The computing system of claim 10, wherein the operations further include:
- based on the selecting of the given candidate cell to be the serving cell for the UE, causing the given candidate cell to be the serving cell for the UE.

12. The computing system of claim 10, wherein selecting the given candidate cell to be the serving cell for the UE comprises selecting the given candidate cell to be (i) a primary cell (PCell) for carrier-aggregation service of the UE, (ii) an anchor cell for dual-connectivity service of the UE, or (iii) a secondary cell for dual-connectivity service of the UE.

13. In a wireless communication system having a plurality of access nodes providing a plurality of cells in which to serve user equipment devices (UEs), a given one of the access nodes comprising:
- a wireless communication interface through which to engage in air-interface communication with served UEs; and
- a controller, wherein the controller is configured to cause the given access node to carry out operations for controlling selection of a serving cell for a UE, the operations including:
  - determining respectively for each of a plurality of candidate cells a maximum backhaul bit rate of the candidate cell, wherein determining the maximum backhaul bit rate respectively of each cell of the candidate cells comprises determining as the maximum backhaul bit rate a predefined maximum bit rate of a respective router port through which backhaul communication for the cell flows,
  - determining that at least two of the candidate cells have the same maximum backhaul bit rate as each other, and
  - responsive to determining that the at least two candidate cells have the same maximum backhaul bit rate as each other, selecting to be the serving cell for the UE a given candidate cell from among the at least two candidate cells, based on a determination that the given candidate cell has a lowest backhaul packet-drop rate among the at least two candidate cells.

14. The access node of claim 13, wherein the controller comprises a processing unit, non-transitory data storage, and program instructions stored in the non-transitory data storage and executable by the processing unit to cause the access node to carry out the operations.

15. The access node of claim 13, wherein selecting the given candidate cell to be the serving cell for the UE comprises selecting the given candidate cell to be (i) a primary cell (PCell) for carrier-aggregation service of the UE, (ii) an anchor cell for dual-connectivity service of the UE, or (iii) a secondary cell for dual-connectivity service of the UE.

* * * * *